United States Patent
Omura

(10) Patent No.: US 10,703,193 B2
(45) Date of Patent: Jul. 7, 2020

(54) VEHICLE EMERGENCY BATTERY SWITCH

(71) Applicant: TOYOTA JIDOSHA KABUSHIKI KAISHA, Toyota-shi, Aichi-ken (JP)

(72) Inventor: Masao Omura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/586,160

(22) Filed: Sep. 27, 2019

(65) Prior Publication Data

US 2020/0023727 A1     Jan. 23, 2020

Related U.S. Application Data

(62) Division of application No. 15/866,789, filed on Jan. 10, 2018, now abandoned.

(30) Foreign Application Priority Data

Jan. 17, 2017  (JP) .................................. 2017-006207

(51) Int. Cl.

| B60R 16/04 | (2006.01) |
|---|---|
| B60K 8/00 | (2006.01) |
| B60K 1/04 | (2019.01) |
| B60L 3/04 | (2006.01) |
| B60L 3/00 | (2019.01) |
| H01M 8/2475 | (2016.01) |

(Continued)

(52) U.S. Cl.
CPC .................. B60K 8/00 (2013.01); B60K 1/04 (2013.01); B60L 3/0015 (2013.01);
(Continued)

(58) Field of Classification Search
CPC .......... B60L 58/20; B60L 58/00; B60L 58/10; B60L 58/18; B60L 58/19; B60L 50/64;
(Continued)

(56) References Cited

U.S. PATENT DOCUMENTS 3,200,014 A * 8/1965 Roberts ................. H01M 16/00
429/9
4,174,014 A * 11/1979 Bjorksten ................. B60K 1/04
180/68.5

(Continued)

FOREIGN PATENT DOCUMENTS

| JP | H11-262198 A | 9/1999 |
|---|---|---|
| JP | 2005-297861 A | 10/2005 |

(Continued)

OTHER PUBLICATIONS

Jun. 27, 2019 U.S. Office Action issued U.S. Appl. No. 15/866,789.

Primary Examiner — James M Dolak
(74) Attorney, Agent, or Firm — Oliff PLC

(57) ABSTRACT

A vehicle includes an electric load, a first battery electrically connected to the electric load, a second battery electrically connected to the electric load in parallel with the first battery, the second battery being closer to a center of the vehicle than the first battery in a top view of the vehicle, a switch configured to electrically disconnect solely the first battery of the first battery and the second battery from the electric load, and a controller configured to open the switch based on detection of a collision of the vehicle or detection of an abnormality of the first battery.

2 Claims, 7 Drawing Sheets

(51) Int. Cl.
*B60L 50/64* (2019.01)
*B60L 58/20* (2019.01)
*H01M 8/04664* (2016.01)
*B60L 50/60* (2019.01)
*H01M 8/04701* (2016.01)
*B60R 16/02* (2006.01)

(52) U.S. Cl.
CPC .............. *B60L 3/0046* (2013.01); *B60L 3/04* (2013.01); *B60L 50/64* (2019.02); *B60L 50/66* (2019.02); *B60L 58/20* (2019.02); *H01M 8/04671* (2013.01); *H01M 8/2475* (2013.01); B60K 2001/0427 (2013.01); B60K 2001/0438 (2013.01); *B60L 3/0053* (2013.01); *B60L 2240/545* (2013.01); *B60L 2240/547* (2013.01); *B60L 2240/549* (2013.01); *B60R 16/0215* (2013.01); *B60Y 2306/01* (2013.01); *B60Y 2410/115* (2013.01); *H01M 8/04731* (2013.01); *H01M 2250/20* (2013.01)

(58) Field of Classification Search
CPC .......... B60L 50/66; B60L 50/50; B60L 50/60; B60L 3/00; B60L 3/04; B60L 3/0046; B60L 3/0092; B60L 3/0015; B60L 3/0007; B60K 2001/0427; B60K 2001/0438; B60K 2001/0422; B60K 2001/0433; B60K 1/04

See application file for complete search history.

(56) References Cited

U.S. PATENT DOCUMENTS

| | | | | |
|---|---|---|---|---|
| 5,002,840 A * | 3/1991 | Klebenow | ........... | H01M 2/0242 |
| | | | | 429/123 |
| 5,389,824 A * | 2/1995 | Moroto | ........... | B60K 28/14 |
| | | | | 307/10.1 |
| 7,416,039 B1 * | 8/2008 | Anderson | ........... | B60K 1/00 |
| | | | | 180/165 |
| 8,051,934 B2 * | 11/2011 | Kiya | ........... | B60K 1/04 |
| | | | | 180/68.5 |
| 8,573,647 B2 * | 11/2013 | Enning | ........... | B60K 1/04 |
| | | | | 280/784 |
| 8,587,907 B2 * | 11/2013 | Gaben | ........... | B60L 3/0046 |
| | | | | 361/54 |
| 9,579,963 B2 | 2/2017 | Landgraf | | |
| 9,623,754 B2 * | 4/2017 | Izumi | ........... | B60L 3/12 |
| 10,059,217 B2 * | 8/2018 | Min | ........... | B60L 58/12 |
| 10,086,705 B2 * | 10/2018 | Chow | ........... | B60L 58/20 |
| 10,283,743 B2 * | 5/2019 | Fujiwara | ........... | B60L 3/0007 |
| 10,300,792 B2 * | 5/2019 | Schussler | ........... | B60L 3/12 |
| 10,315,500 B2 | 6/2019 | Schroth et al. | | |
| 10,315,521 B2 * | 6/2019 | Kato | ........... | B60L 3/0038 |
| 10,361,466 B2 * | 7/2019 | Hinterberger | ........... | B60L 58/27 |
| 10,381,620 B2 * | 8/2019 | Takahashi | ........... | B60K 1/04 |
| 10,411,482 B2 * | 9/2019 | Greenwood | ........... | B60L 3/04 |
| 10,442,309 B2 * | 10/2019 | Goetz | ........... | B60L 50/64 |
| 10,464,424 B2 * | 11/2019 | Saito | ........... | B60L 3/00 |
| 2013/0140886 A1 * | 6/2013 | Bito | ........... | B60L 3/0046 |
| | | | | 307/10.7 |
| 2015/0097425 A1 | 4/2015 | Kimura et al. | | |

FOREIGN PATENT DOCUMENTS

| | | |
|---|---|---|
| JP | 2011-18553 A | 1/2011 |
| JP | 2014-76716 A | 5/2014 |
| JP | 2014-155327 A | 8/2014 |
| JP | 2015-157608 A | 9/2015 |
| JP | 2015-216729 A | 12/2015 |
| WO | 2013/157049 A1 | 10/2013 |

\* cited by examiner

VEHICLE EMERGENCY BATTERY SWITCH

INCORPORATION BY REFERENCE

This application is a divisional application of U.S. patent application Ser. No. 15/866,789 filed Jan. 10, 2018, which claims the benefit of Japanese Patent Application No. 2017-006207 filed Jan. 17, 2017. The disclosure of the prior applications is hereby incorporated by reference herein in their entirety.

BACKGROUND

1. Technical Field

The present disclosure relates to a vehicle including a plurality of batteries.

2. Description of Related Art

A technique is known in which an intercooler is disposed on a front side of a vehicle from a fuel cell stack, thereby protecting the fuel cell stack from an impact at the time of a front collision of a vehicle (for example, see Japanese Unexamined Patent Application Publication No. 2015-157608 (JP 2015-157608 A)).

SUMMARY

However, it is difficult to electrically disconnect solely some of a plurality of batteries included in the fuel cell stack at the time of a collision of the vehicle from an electric load to make solely other batteries available.

The disclosure provides a vehicle that makes solely some batteries among a plurality of batteries available at the time of a collision of the vehicle.

An aspect of the disclosure relates to a vehicle including an electric load, a first battery, a second battery, a switch, and a controller. The first battery is electrically connected to the electric load. The second battery is electrically connected to the electric load in parallel with the first battery. The second battery is closer to a center of the vehicle than the first battery in a top view of the vehicle. The switch is configured to electrically disconnect solely the first battery of the first battery and the second battery from the electric load. The controller is configured to open the switch based on detection of a collision of the vehicle or detection of an abnormality of the first battery.

According to the aspect of the disclosure, since the second battery is disposed closer to the center of the vehicle than the first battery in the top view of the vehicle, there is a high possibility that the first battery is damaged more than the second battery at the time of a collision. With the use of the above-described point, the switch is opened based on detection of a collision of the vehicle or detection of an abnormality of the first battery. In a case where the switch is opened, solely the first battery of the first battery and the second battery is electrically disconnected from the electric load. With this, it is possible to make solely the second battery available at the time of a collision of the vehicle. As a result, it is possible to safely operate the electric load solely with the second battery that is hardly damaged than the first battery at the time of a collision.

In the vehicle according to the aspect of the disclosure, the first battery may be provided on each of both sides of the second battery in a predetermined direction in the top view of the vehicle. According to the aspect of the disclosure, it is possible to protect, with the first battery, the second battery from a collision in a form that force is applied in the predetermined direction.

In the vehicle according to the aspect of the disclosure, the predetermined direction may be a vehicle width direction of the vehicle. According to the aspect of the disclosure, it is possible to protect the second battery from a side collision.

In the vehicle according to aspect of the disclosure, the first battery and the second battery may be housed inside a single housing. The second battery may be provided closer to a center of the housing than the first battery in the top view of the vehicle. According to the aspect of the disclosure, it is possible to protect the second battery with the first battery inside the housing.

In the vehicle according to the aspect of the disclosure, the first battery may be provided within a predetermined area where deformation for impact absorption at the time of a collision is permitted in the vehicle. The second battery may be provided outside the predetermined area. According to the aspect of the disclosure, it is possible to use the first battery for impact absorption.

The vehicle according to the aspect of the disclosure may further include a seat, and a frame member in a vehicle width direction configured to support the seat. The second battery may be provided within a range not overlapping a movable range of the frame member accompanied with position adjustment in a front-rear direction of the seat in a side view of the vehicle. According to the aspect of the disclosure, it is possible to prevent the second battery from being damaged due to the frame member that can move inward of the vehicle at the time of a side collision.

In the vehicle according to the aspect of the disclosure, the second battery may be disposed to be offset with respect to the first battery in a front-rear direction of the vehicle. According to the aspect of the disclosure, it is possible to arrange the first battery and the second battery without needing a space in the vehicle width direction.

The vehicle according to the aspect of the disclosure may further include a seat, a first frame member in a vehicle width direction configured to support the seat, and a second frame member in the vehicle width direction configured to support the seat and provided on an opposite side of the first frame member from the first battery and the second battery. The first battery and the second battery may be provided within a range overlapping a movable range of the first frame member and the second frame member accompanied with position adjustment in a front-rear direction of the seat in a side view of the vehicle. The first battery and the second battery may be provided between the first frame member and the second frame member in a form that the first battery is positioned on each of both sides of the second battery in the vehicle width direction of the vehicle in the top view of the vehicle. According to the aspect of the disclosure, while a load is input the first battery through the frame member at the time of a side collision, even in the case described above, it is possible to protect the second battery with the first battery.

According to the aspect of the disclosure, it is possible to make solely some batteries among a plurality of batteries available at the time of a collision of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, each example will be described in detail referring to the accompanying drawings.

Figure 1:
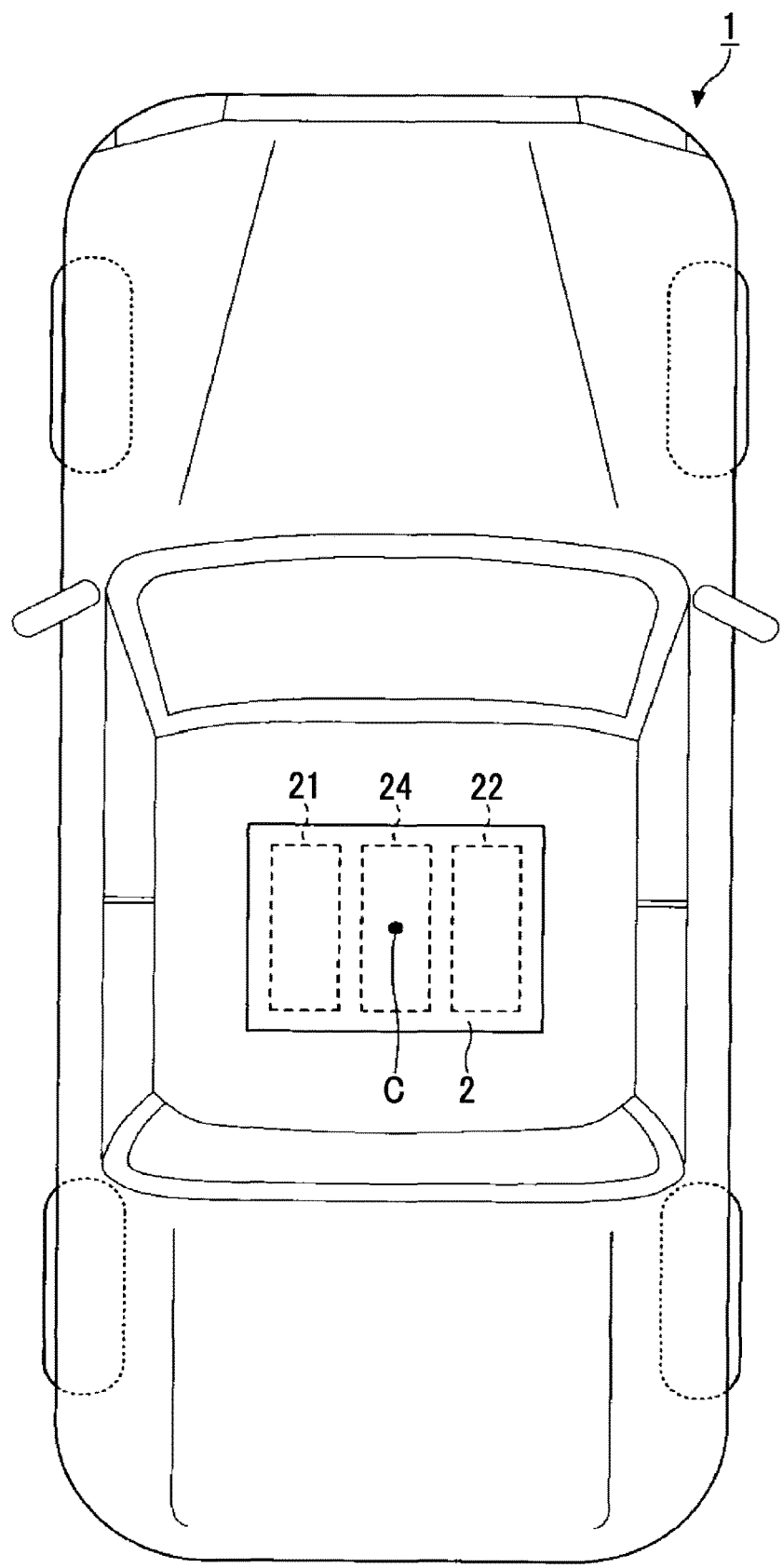
FIG. 1 is a diagram schematically showing a top view of a vehicle.
Figure 2:
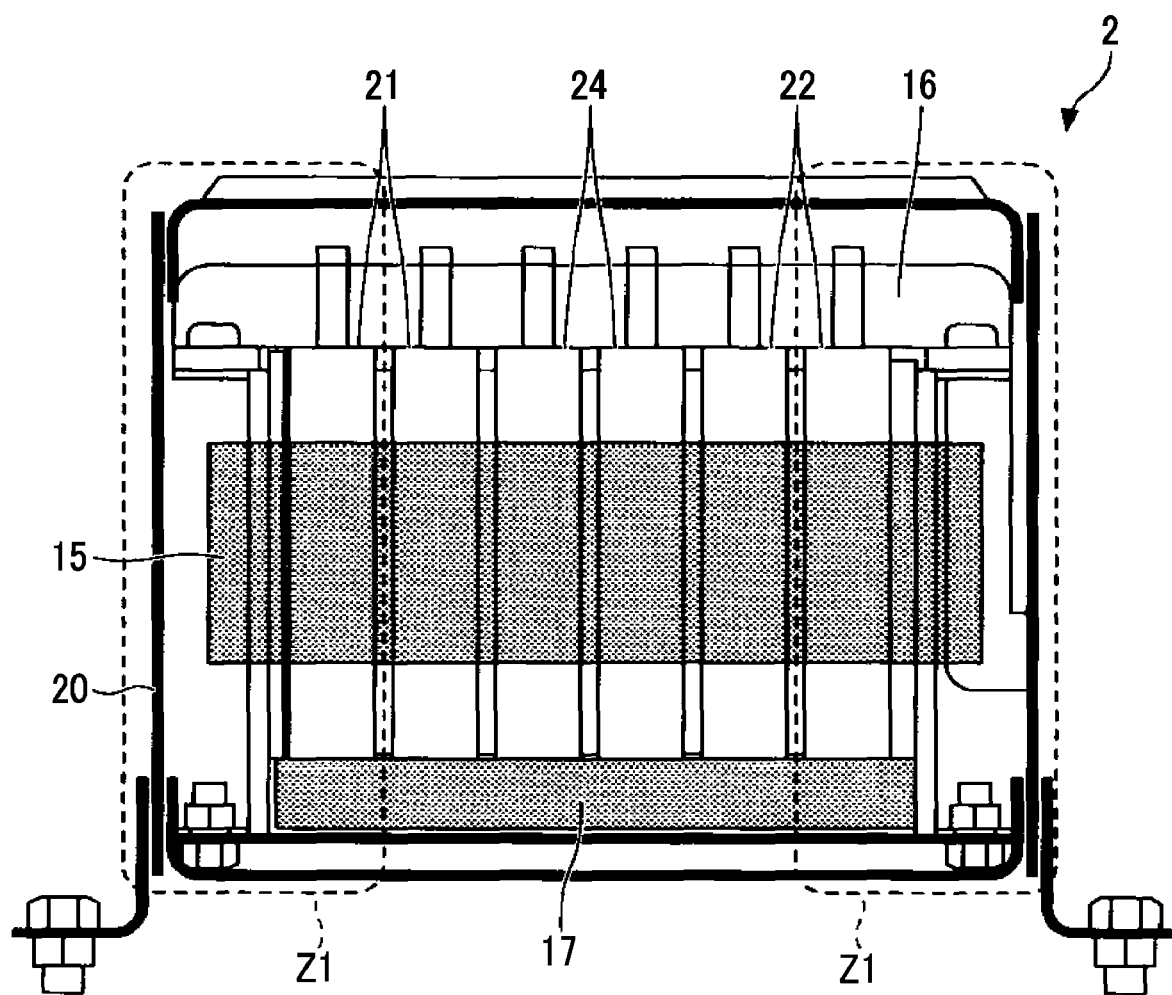
FIG. 2 is a diagram of a battery pack when viewed from a back side.

FIG. 1 is a diagram schematically showing a top view of a vehicle. In the following description, "connection" means "electrical connection". FIG. 2 is a diagram of a battery pack 2 when viewed from a back side and is a diagram showing the inside of the battery pack 2 when viewed through a back surface (battery case 20 portion).

The vehicle 1 includes the battery pack 2. The battery pack 2 is disposed below a center console, for example. The battery pack 2 has the battery case 20, and includes, inside the battery case 20, normal battery cells 21, 22 (an example of a first battery) and an emergency battery cell 24 (an example of a second battery). The normal battery cells 21, 22 are arranged in a form of sandwiching the emergency battery cell 24 in a vehicle width direction. That is, the normal battery cells 21, 22 are provided on both sides of the emergency battery cell 24 in the vehicle width direction in a top view of the vehicle 1, respectively. Specifically, the emergency battery cell 24 is provided closer to a center C of the battery case 20 than the normal battery cells 21, 22 in the top view of the vehicle 1. With this, it is possible to protect the emergency battery cell 24 with the normal battery cells 21, 22 at the time of a side collision. The normal battery cells 21, 22 are provided within a predetermined area (hereinafter, referred to as a "crushable zone") where deformation for impact absorption at the time of a collision is permitted in the vehicle. The emergency battery cell 24 is provided in an area outside the crushable zone. That is, the emergency battery cell 24 is not provided in the crushable zone. In FIG. 2, a crushable zone Z1 is schematically shown.

In an example shown in FIG. 2, the normal battery cells 21, 22 and the emergency battery cell 24 are fixed to the battery case 20 by a common battery cell binding portion 15. Below the battery case 20, a common cooling duct 17 is provided. The cooling duct 17 forms cooling means for cooling the normal battery cells 21, 22 and the emergency battery cell 24. Above the battery case 20, a common exhaust gas duct 16 is provided. The exhaust gas duct 16 forms exhaust gas means.

Figure 3:
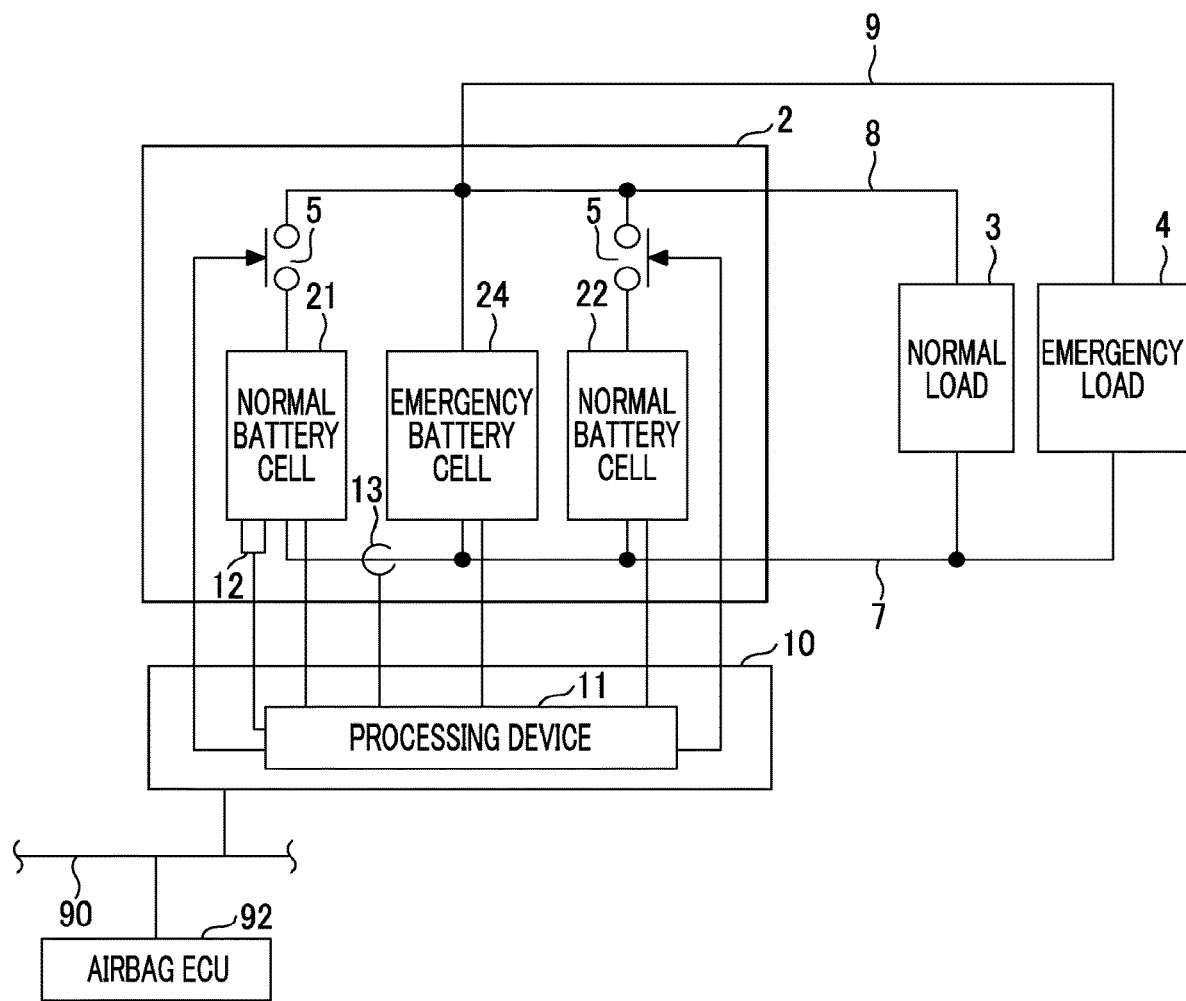
FIG. 3 is a schematic system configuration diagram of the vehicle.

FIG. 3 is a schematic system configuration diagram of the vehicle 1.

As shown in FIG. 3, the normal battery cells 21, 22 and the emergency battery cell 24 are connected in parallel between a ground line 7 and a normal load power line 8. Battery shutoff relays 5 (an example of a switch) are provided between positive electrode sides of the normal battery cells 21, 22 and the normal load power line 8. The battery shutoff relays 5 is closed in a normal state. The battery shutoff relays 5 may be arranged between negative electrode sides of the normal battery cells 21, 22 and the ground line 7. The normal battery cell 21 is provided with a thermistor 12. The ground line 7 is provided with a current sensor 13. A normal load 3 is connected to the normal load power line 8.

The normal load 3 is an electronic apparatus (an example of an electric load) including electronic control units (ECU), sensors, accessories, and the like, and operates during a normal state except at the time of a collision.

An emergency load 4 is connected to the normal load power line 8 through an emergency load wire 9. The emergency load 4 is a predetermined electric load (an example of an electric load) that realizes a predetermined function after a collision of the vehicle. The emergency load 4 is a shift-by-wire system, a Mayday system (a system that realizes an emergency call function), or the like. The Mayday system includes a wireless communication device using a mobile phone network. The normal load power line 8 is connected to the normal battery cells 21, 22 and the emergency battery cell 24 in parallel with the normal load 3.

The vehicle 1 includes a battery ECU 10 that monitors the normal battery cells 21, 22 and the emergency battery cell 24. The battery ECU 10 includes a processing device 11. The processing device 11 is realized by a computer. Specifically, though not shown, the processing device 11 includes a central processing unit (CPU), a random access memory (RAM), a read only memory (ROM), an auxiliary storage device, a communication interface, and the like, and the CPU executes a program in a storage device to realize various functions.

The thermistor 12, the current sensor 13, and the battery shutoff relay 5 are connected to the battery ECU 10. An airbag ECU 92 is connected to the battery ECU 10 through a controller area network (CAN) 90.

The processing device 11 opens the battery shutoff relays 5 based on detection of a collision of the vehicle 1 or detection of an abnormality of the normal battery cells 21, 22. That is, the processing device 11 opens the battery shutoff relays 5 in a case where a collision of the vehicle 1 or an abnormality of the normal battery cells 21, 22 is detected.

A collision of the vehicle can be detected based on information (for example, a collision detection signal) from the airbag ECU 92. Alternatively, the processing device 11 may determine the presence or absence of a collision of the vehicle based on a signal from an acceleration sensor (not shown).

An abnormality of the normal battery cells 21, 22 can be detected based on information from the thermistor 12 or the current sensor 13. For example, in a case where information indicating an abnormality (an overcurrent, an overvoltage, a battery temperature abnormality, or the like) is obtained from the thermistor 12 or the current sensor 13, an abnormality of the normal battery cells 21, 22 is detected. As an abnormality of the normal battery cells 21, 22, individual abnormalities of the normal battery cells 21, 22 may be detected, or detection may be made in a form that a normal battery cell of the normal battery cells 21, 22 in which an abnormality occurs is unclear. In a configuration in which the individual abnormalities of the normal battery cells 21, 22 are detected, solely the battery shutoff relay 5 of a normal battery cell of the normal battery cells 21, 22 in which an abnormality is detected may be opened. In the example, it is assumed that the battery shutoff relays 5 related to both of the normal battery cells 21, 22 are opened as an example.

In a case where the battery shutoff relays 5 are opened, the normal battery cells 21, 22 are electrically disconnected from the normal load power line 8. With this, the normal battery cells 21, 22 are electrically disconnected from the normal load 3 and the emergency load 4. As a result, it is possible to safely operate solely the emergency battery cell 24.

As described above, the normal battery cells 21, 22 are provided in the crushable zone. With this, the normal battery cells 21, 22 are damaged at the time of a collision (in particular, at the time of a side collision) of the vehicle 1. As a result, the normal battery cells 21, 22 are likely to be abnormal at the time of a collision of the vehicle 1.

From the above-described point, according to the example, the battery shutoff relays 5 are opened based on detection of a collision of the vehicle 1 or detection of an abnormality of the normal battery cells 21, 22. Accordingly, it is possible to open the battery shutoff relays 5 at the time of a collision of the vehicle 1. In a case where the battery shutoff relays 5 are opened, the normal battery cells 21, 22 are electrically disconnected from the normal load power line 8. That is, it is possible to make solely the emergency battery cell 24 in the battery pack 2 available. With this, the normal battery cells 21, 22 are electrically disconnected from the normal load 3 and the emergency load 4. As a result, it is possible to safely operate solely the emergency battery cell 24 at the time of a collision of the vehicle 1.

According to the example, the normal battery cells 21, 22 and the emergency battery cell 24 are arranged inside the single battery case 20. With this, it is possible to share the battery case 20 or share wiring to the normal battery cells 21, 22 and the emergency battery cell 24, binding or fixing means, cooling means, and exhaust gas means of the normal battery cells 21, 22 and the emergency battery cell 24, wiring to the battery ECU 10, and the like compared to a case where the normal battery cells 21, 22 and the emergency battery cell 24 are arranged in separate housings. As a result, it is possible to further reduce costs, weight, and constitution.

Figure 4:
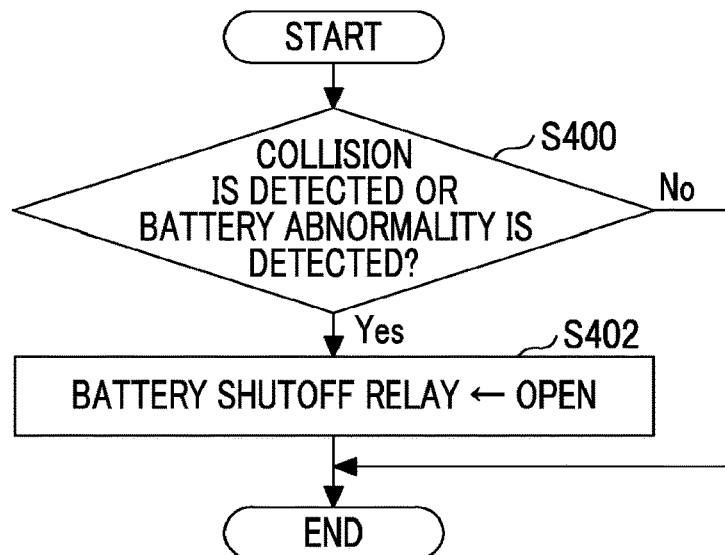
FIG. 4 is a schematic flowchart showing an operation example by a processing device of a battery ECU.

FIG. 4 is a schematic flowchart showing an operation example by the processing device 11 of the battery ECU 10. Processing shown in FIG. 4 is performed in every predetermined cycle, for example, in a state where an ignition switch is powered on.

In Step S400, the processing device 11 determines whether or not a collision of the vehicle 1 or an abnormality of the normal battery cells 21, 22 is detected.

In Step S402, the processing device 11 opens the battery shutoff relays 5.

According to the processing shown in FIG. 4, in a state in which the ignition switch is powered on, the presence or absence of a collision of the vehicle 1 or an abnormality of the normal battery cells 21, 22 is monitored, and the battery shutoff relays 5 can be opened based on detection of a collision of the vehicle 1 or detection of an abnormality of the normal battery cells 21, 22.

Figure 5:
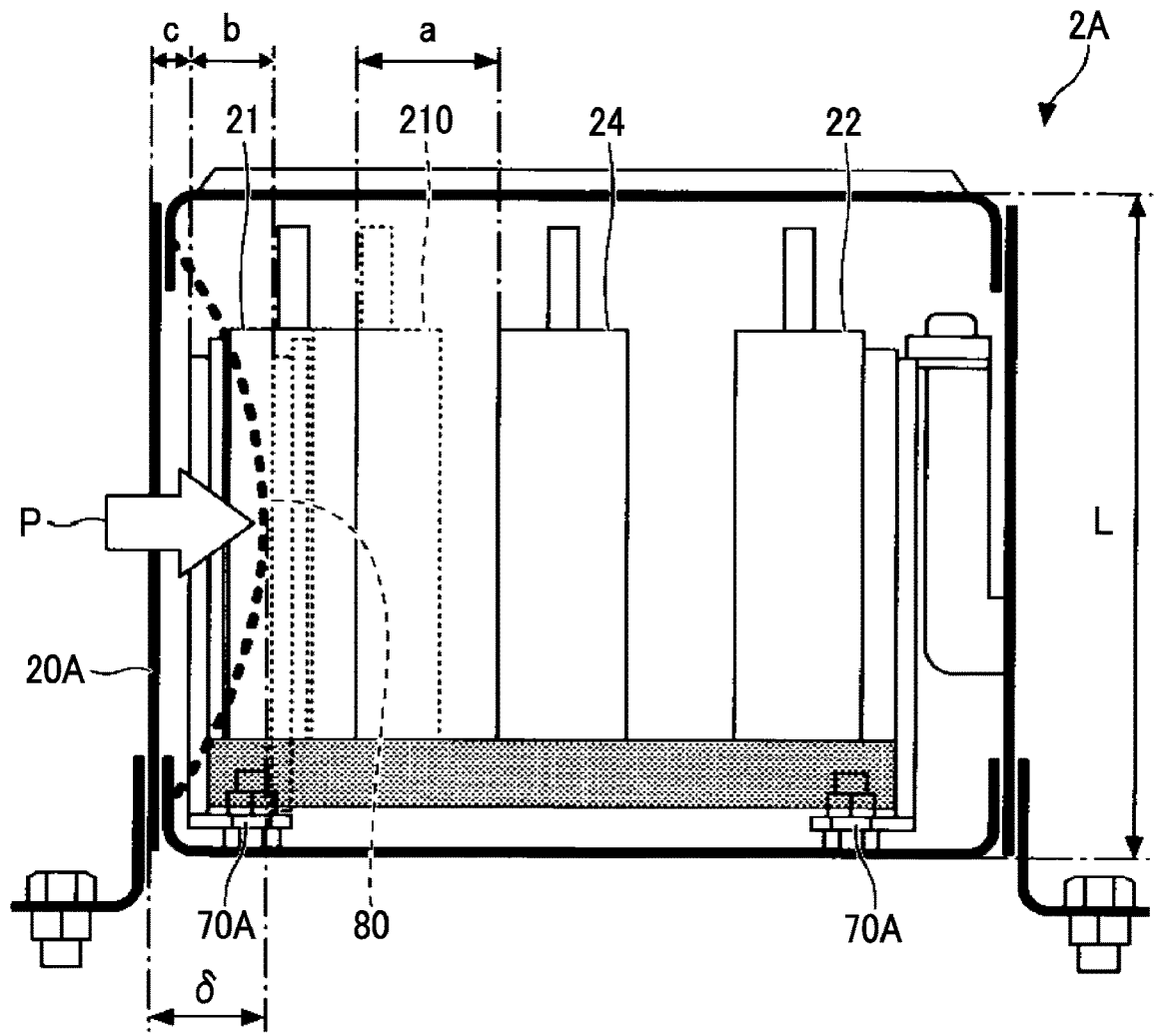
FIG. 5 is an explanatory view of a preferred battery arrangement structure inside a battery case.

Referring to FIG. 5 and subsequent drawings, a preferred battery arrangement structure inside the battery case will be described.

FIG. 5 is an explanatory view of a preferred battery arrangement structure inside a battery case 20A. Similarly to FIG. 2, FIG. 5 is a diagram of a battery pack 2A when viewed from a back side and is a diagram showing the inside the battery pack 2A when viewed through a back surface (battery case 20A portion).

In FIG. 5, unlike FIG. 2, while the normal battery cells 21, 22 and the emergency battery cell 24 are provided to be horizontally arranged one by one, the difference described above is not indispensable.

In FIG. 5, external force P according to a collision is schematically shown.

In a case where the external force P is applied, a side plate (hereinafter, referred to as a "case side plate") of the battery case 20A is deformed inward as indicated by a dotted line 80 in FIG. 5. As a result, the normal battery cell 21 moves inward as indicated by a dotted line 210 in FIG. 5. In this case, dimensions a, b, c, and the like are set such that the normal battery cell 21 and the emergency battery cell 24 do not interfere with each other.

Specifically, in FIG. 5, the meanings of respective characters are as follows.

a: the interval between the normal battery cell 21 and the emergency battery cell 24 b: a case side plate×battery cell interference amount according to the external force P c: the interval between the battery case 20A and a cell fixing portion 70A (an outermost part integrated with the normal battery cell 21) of the normal battery cell 21

δ: a deflection amount of the case side plate according to the external force P

E: a Young's modulus of the case side plate

I: a sectional secondary moment of the case side plate

In this case, the deflection amount δ of the case side plate according to the external force P can be calculated by the following expression.

$$\delta = P/48E \bullet I/L)$$

For simplification, it is assumed that reaction force at the time of interference of the case side plate and the normal battery cell 21 is neglected. The case side plate×battery cell interference amount b according to the external force P is as follows.

$$b = \delta - c$$

Accordingly, an arrangement in which the interval a between the normal battery cell 21 and the emergency battery cell 24 is sufficiently greater than b is realized, whereby, even in a case where the external force P according to a collision is applied to the battery case 20A, it is possible to prevent interference of the normal battery cell 21 and the emergency battery cell 24. That is, even though the battery case 20A is deformed with the application of the external force and the normal battery cell 21 moves toward the emergency battery cell 24, the normal battery cell 21 is not brought into direct contact with the emergency battery cell 24, and an input load to the emergency battery cell 24 can be further reduced. With this, it is possible to protect the emergency battery cell 24.

Figure 6:
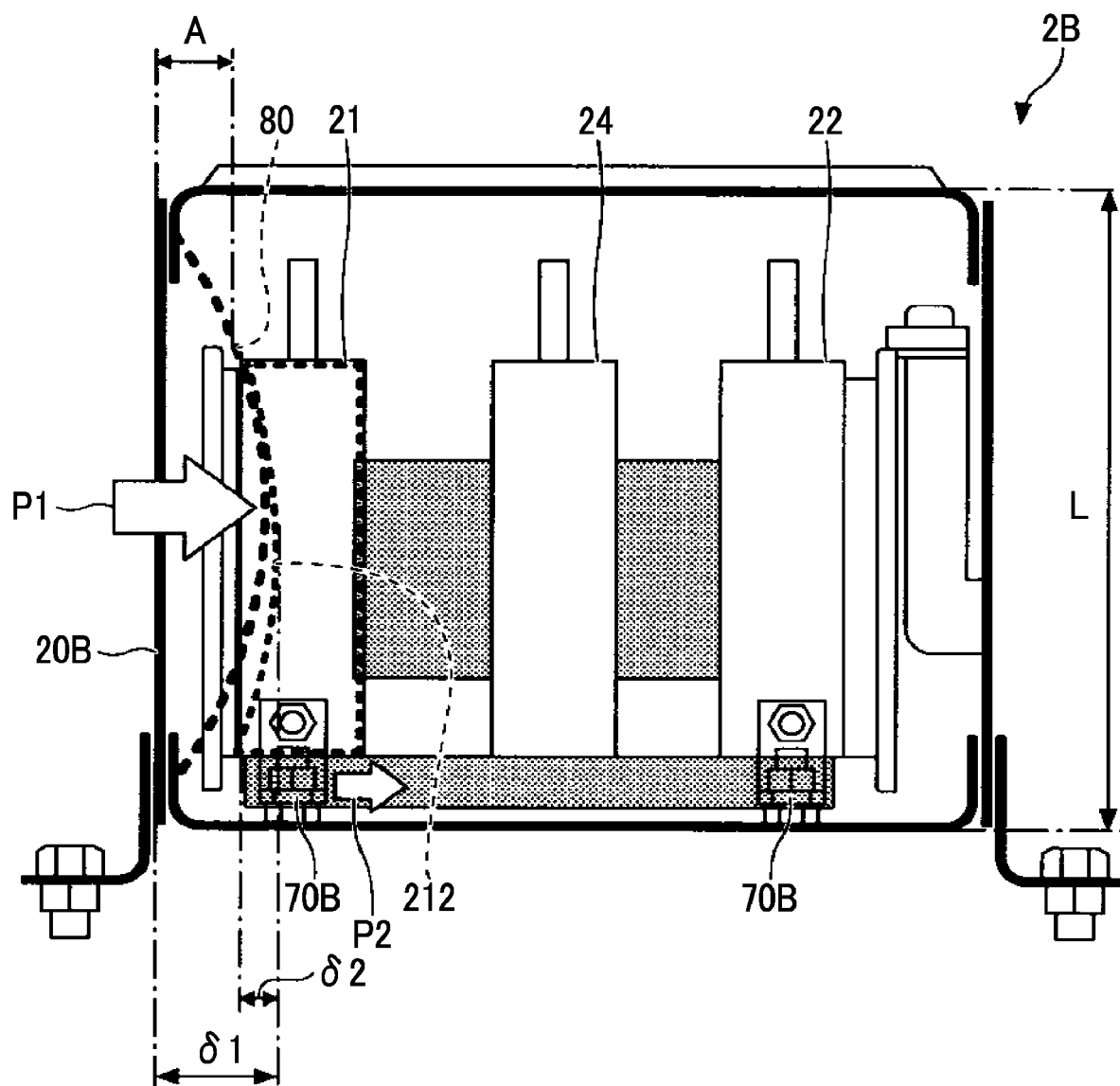
FIG. 6 is an explanatory view of another preferred battery arrangement structure inside the battery case.

FIG. 6 is an explanatory view of another preferred battery arrangement structure inside a battery case 20B. Similarly to FIG. 2, FIG. 6 is a diagram of the battery pack 2B when viewed from a back side and is a diagram showing the inside the battery pack 2B when viewed through a back surface (battery case 20B portion).

In FIG. 6, unlike FIG. 2, while the normal battery cells 21, 22 and the emergency battery cell 24 are provided to be horizontally arranged one by one, the difference described above is not indispensable.

In FIG. 6, external force P1 according to a collision is schematically shown. In a case where the external force P1 is applied, a side plate (case side plate) of the battery case 20B is deformed inward as indicated by a dotted line 80 in FIG. 6. As a result, the normal battery cell 21 is deformed inward as indicated by a dotted line 212 in FIG. 6. In this case, battery cell reaction force is applied to a cell fixing portion 70B. In FIG. 6, stress P2 according to the deformation of the normal battery cell 21 is schematically shown. Fixing strength of the cell fixing portion 70B is set so as not to be fractured even by the stress P2.

Specifically, in FIG. 6, the meanings of respective characters are as follows.

δ1: a deflection amount of the case side plate according to the external force P1

δ2: a deformation amount of the normal battery cell 21 according to the external force P1

E1: a Young's modulus of the case side plate

I1: a sectional secondary moment of the case side plate

A: the interval between the battery and the case

In this case, the deflection amount δ1 of the case side plate according to the external force P1 can be calculated by the following expression.

$$\delta 1 = P1/(48 E1 \cdot I1/L)$$

For simplification, it is assumed that reaction force at the time of interference of the case side plate and the normal battery cell 21 is neglected. The deformation amount δ2 of the normal battery cell 21 according to the external force P1 is as follows.

$$\delta 2 = \delta 1 - A$$

Accordingly, the stress P2 of the battery cell at the time of δ2 deformation is obtained experimentally, for example, and the fixing strength of the cell fixing portion 70B is set to be greater than P2, whereby, even in a case where the external force P1 according to a collision is applied to the battery case 20B, it is possible to prevent interference of the normal battery cell 21 and the emergency battery cell 24. Specifically, while the battery case 20B or the normal battery cell 21 is deformed with the application of the external force P1, since the fixing strength can be secured, the normal battery cell 21 does not move inward. As a result, the normal battery cell 21 is not brought into direct contact with the emergency battery cell 24, and an input load to the emergency battery cell 24 can be further reduced. With this, it is possible to protect the emergency battery cell 24.

Figure 7:
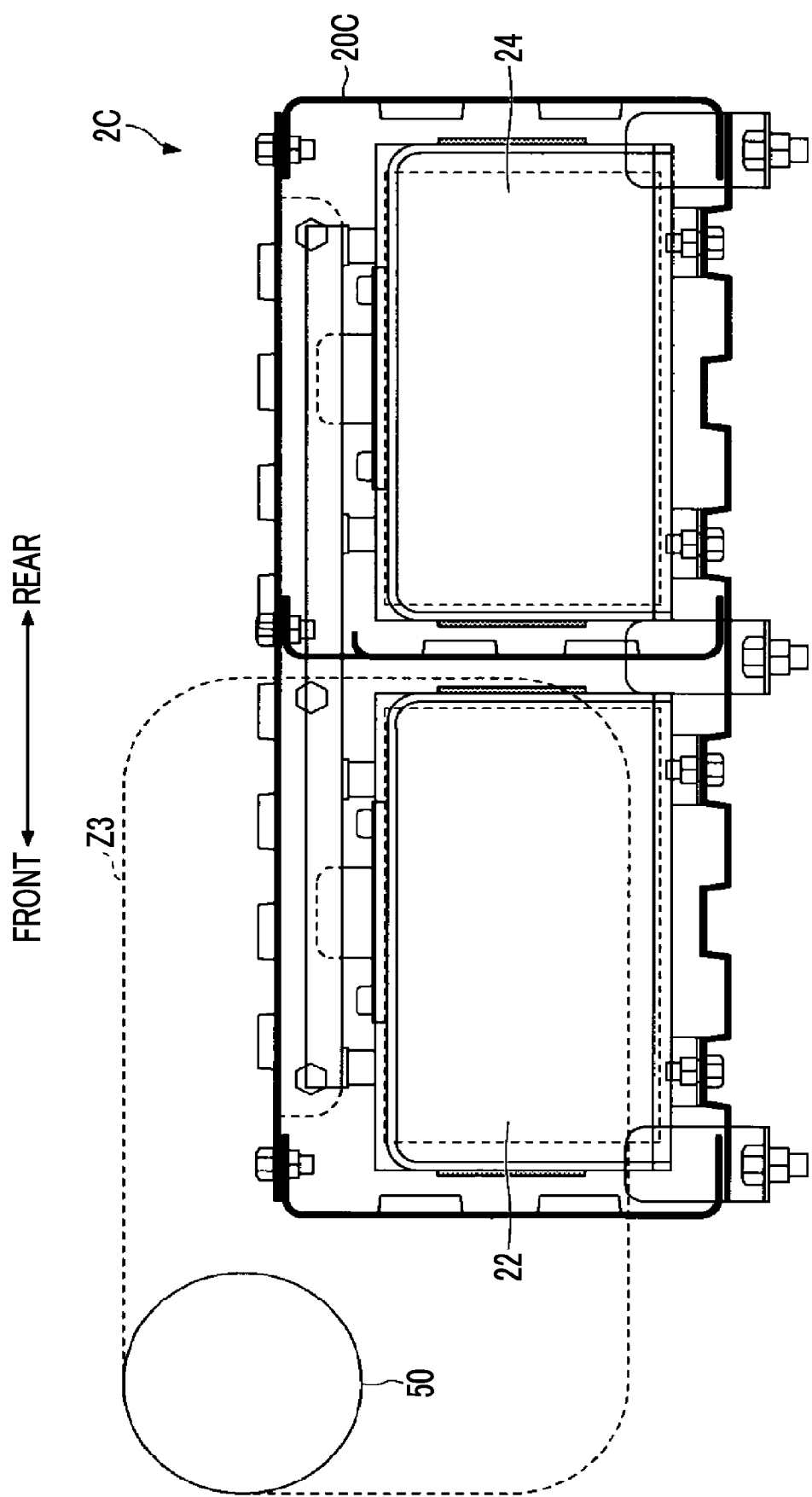
FIG. 7 is an explanatory view of another preferred battery arrangement structure inside the battery case.

FIG. 7 is an explanatory view of another preferred battery arrangement structure inside a battery case 20C. FIG. 7 is a diagram of a battery pack 2C when viewed from a side surface and is a diagram showing the inside of the battery pack 2C when viewed through the side surface (battery case 20C portion).

In the battery pack 2C shown in FIG. 7, the emergency battery cell 24 is disposed so as not to enter a movable range Z3 (a movable range due to seat position adjustment) of a horizontal frame member 50. The frame member 50 supports the seat 40. That is, the emergency battery cell 24 is disposed within a range not overlapping the movable range Z3 of the frame member 50 in a side view of the vehicle. In an example shown in FIG. 7, while the normal battery cell 21 is positioned within the movable range Z3, the emergency battery cell 24 is disposed to be offset to a vehicle rear side with respect to the movable range Z3. In the example shown in FIG. 7, the normal battery cell 22 may be disposed in a form of being adjacent to the normal battery cell 21. In FIG. 7, while the single frame member 50 is shown for simplification, a plurality of frame members 50 may be provided, and in this case, the movable range Z3 of the frame members 50 is a movable area as the whole of the frame members 50.

Figure 8:
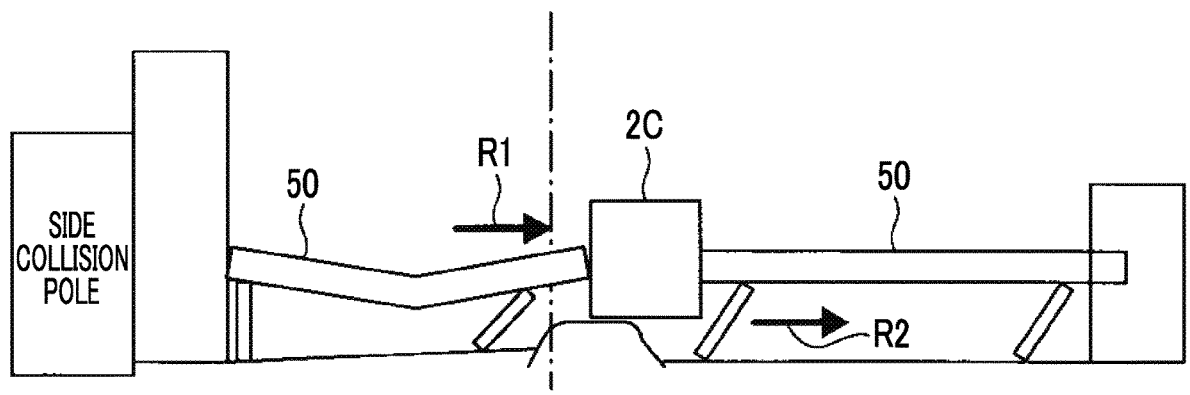
FIG. 8 is an explanatory view of the relationship between a frame member and a battery pack at the time of a side collision.

FIG. 8 is an explanatory view of the relationship between a frame member 50 and the battery pack 2C at the time of a side collision and is a diagram schematically showing a state at the time of a side collision with a side collision pole.

As shown in FIG. 8, at the time of a side collision with the side collision pole, the frame member 50 on the side collision side moves inward of the vehicle (see an arrow R1) and is brought into contact with the normal battery cell 21. However, as described above, the emergency battery cell 24 is positioned outside the movable range Z3 of the frame member 50. With this, even though the frame member 50 moves inward of the vehicle, the frame member 50 is not brought into direct contact with the emergency battery cell 24, and an input load to the emergency battery cell 24 can be further reduced. With this, it is possible to protect the emergency battery cell 24.

Although the examples have been described in detail, the disclosure is not limited to a specific example, and various modifications and changes may be made. In addition, all or a plurality of constituent elements of the examples described above may be combined.

For example, in the example shown in FIG. 2, in order to achieve protection from a side collision, the normal battery cells 21, 22 are provided on both sides of the emergency battery cell 24 in the vehicle width direction in the top view of the vehicle 1, respectively; however, the disclosure is not limited thereto. For example, in order to achieve protection from a collision in a front-rear direction, the normal battery cells 21, 22 may be provided on both sides of the emergency battery cell 24 in the front-rear direction of the vehicle in the top view of the vehicle 1, respectively. However, in general, since the crushable zone is narrow in the vehicle width direction, the disclosure is suitable as a configuration for achieving protection from a side collision.

Figure 9:
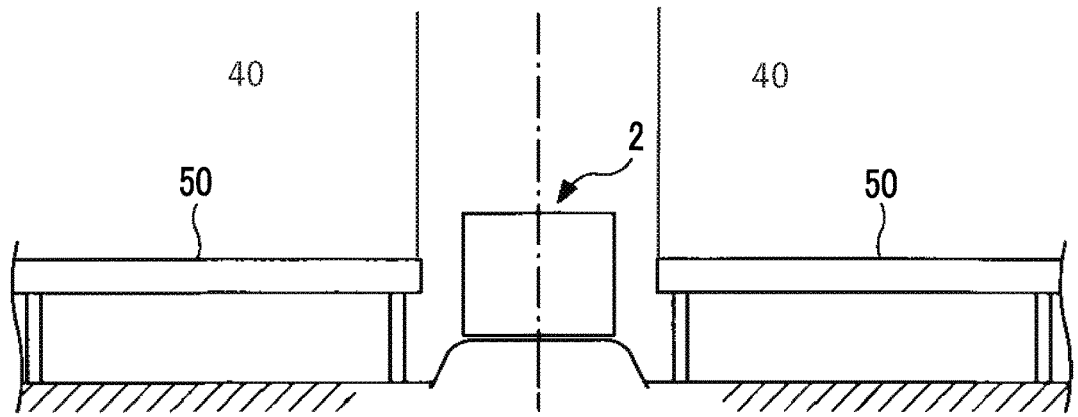
FIG. 9 is a schematic view showing the relationship between the battery pack and the frame member from a back surface.

In the above-described example, the battery pack 2, 2A, or 2B may be arranged within the movable range Z3 (FIG. 7) of the horizontal frame member 50. FIG. 9 is a schematic view showing the relationship between the battery pack 2 and the frame member 50 from a back surface. In this case, similarly to FIG. 8, at the time of a side collision with the side collision pole, the frame member 50 on the side collision side moves inward of the vehicle (see the arrow R1 of FIG. 8) and is brought into contact with the side surface of the battery pack 2. In this case, external force P3 is applied to the side surface of the battery pack 2. The external force P3 corresponds to the external force P or the external force P1 described with reference to FIG. 5, 6, or the like. In this case, as described above, the normal battery cells 21, 22 are also arranged in a form of sandwiching the emergency battery cell 24 in the vehicle width direction. With this, it is possible to effectively protect the emergency battery cell 24.

What is claimed is:

1. A vehicle comprising:
   an electric load;
   a first battery electrically connected to the electric load;
   a second battery electrically connected to the electric load in parallel with the first battery, the second battery being closer to a center of the vehicle than the first battery in a top view of the vehicle;

a switch that, when open, electrically disconnects solely the first battery from the electric load;

a controller that opens the switch based on detection of a collision of the vehicle or detection of an abnormality of the first battery;

a seat; and a frame member for the seat, the frame member extending in a vehicle width direction and being movable within a movable range in front and rear directions of the vehicle as a position of the seat is adjusted, wherein the second battery is provided outside the movable range in a side view of the vehicle.

2. The vehicle according to claim 1, wherein at least a portion of the second battery overlaps the first battery in the side view of the vehicle.

* * * * *